US008410213B2

(12) United States Patent
Barker et al.

(10) Patent No.: US 8,410,213 B2
(45) Date of Patent: Apr. 2, 2013

(54) PRIMERLESS TWO-PART POLYURETHANE ADHESIVE

(76) Inventors: Michael James Barker, Powell, OH (US); Lubica Alabakovska, Hilliard, OH (US); Junxian Wu, Dublin, OH (US)

( * ) Notice: Subject to any disclaimer, the term of this patent is extended or adjusted under 35 U.S.C. 154(b) by 489 days.

(21) Appl. No.: 12/687,988

(22) Filed: Jan. 15, 2010

(65) Prior Publication Data
US 2010/0186897 A1 Jul. 29, 2010

Related U.S. Application Data

(60) Provisional application No. 61/205,982, filed on Jan. 26, 2009.

(51) Int. Cl.
*C08L 75/00* (2006.01)
*C09J 201/00* (2006.01)
(52) U.S. Cl. .................................. 524/590; 156/331.7
(58) Field of Classification Search .................. 524/590; 156/331, 331.7
See application file for complete search history.

(56) References Cited

U.S. PATENT DOCUMENTS

| 4,552,934 A * | 11/1985 | Rabito et al. .................. 525/458 |
|---|---|---|
| 4,704,446 A | 11/1987 | Goel |
| 4,717,738 A | 1/1988 | Fukuda et al. |
| 4,743,672 A | 5/1988 | Goel |
| 4,795,810 A | 1/1989 | Harris |
| 4,826,885 A | 5/1989 | Tsai |
| 4,855,077 A | 8/1989 | Shikinami et al. |
| 4,876,308 A | 10/1989 | Melby et al. |
| 4,888,124 A | 12/1989 | Blum et al. |
| 4,923,756 A | 5/1990 | Chung et al. |
| 5,204,439 A | 4/1993 | Dormish et al. |
| 5,272,204 A | 12/1993 | Akimoto et al. |
| 5,319,053 A | 6/1994 | Slack et al. |
| 5,319,054 A | 6/1994 | Slack et al. |
| 5,326,833 A | 7/1994 | Parodi et al. |
| 5,340,901 A | 8/1994 | Wang |
| 5,349,040 A | 9/1994 | Trinks et al. |
| 5,663,272 A * | 9/1997 | Slack et al. ..................... 528/69 |
| 5,668,211 A * | 9/1997 | Dormish ....................... 524/590 |
| 5,783,652 A * | 7/1998 | Rosthauser et al. ............ 528/48 |
| 6,028,158 A | 2/2000 | Slack et al. |
| RE37,386 E | 9/2001 | Melby |
| 6,355,760 B1 | 3/2002 | Papon et al. |
| 6,365,650 B1 | 4/2002 | Chen et al. |
| 6,482,913 B1 | 11/2002 | Markusch et al. |
| 6,515,164 B1 | 2/2003 | Bolte et al. |
| 6,569,352 B1 | 5/2003 | Hillshafer et al. |
| 6,991,746 B2 | 1/2006 | Slack et al. |
| 7,223,890 B2 | 5/2007 | Radovich et al. |
| 7,291,672 B2 | 11/2007 | Taneichi et al. |
| 2004/0259968 A1 | 12/2004 | Krebs |
| 2007/0270543 A1 | 11/2007 | Wagner et al. |
| 2007/0282090 A1 | 12/2007 | Padurschel et al. |
| 2008/0096995 A1 | 4/2008 | Bedri et al. |
| 2008/0227878 A1 | 9/2008 | Garrett et al. |
| 2009/0214873 A1 | 8/2009 | Demmig |

OTHER PUBLICATIONS

From the International Searching Authority—Notification of Transmittal of the International Search Report and the Written Opinion of the International Searching Authority, or the Declaration from the corresponding PCT application Jun. 1, 2010.

* cited by examiner

*Primary Examiner* — Aiqun Li
(74) *Attorney, Agent, or Firm* — Mark A. Montana

(57) ABSTRACT

A two-part polyurethane adhesive comprising a prepolymer having the reaction product of a non-ionic surfactant and an allophanate modified isocyanate and a curative having a urethane modified high molecular weight polyol, a urethane modified cross-linking compound and a non-urethane modified low molecular weight chain extending compound. The curative has less than 5 equivalent percent total amino and hydroxyl groups having an equivalent weight greater than about 200. The two-part polyurethane adhesive may be used to adhere one or more substrates and can generally be applied without primer or any significant surface preparation.

26 Claims, No Drawings

PRIMERLESS TWO-PART POLYURETHANE ADHESIVE

CROSS REFERENCE TO RELATED APPLICATIONS

This application claims the benefit of U.S. patent application Ser. No. 61/205,982, filed Jan. 26, 2009. U.S. patent application Ser. No. 61/205,982 is incorporated herein in its entirety by reference.

BACKGROUND OF THE INVENTION

1. Field of the Invention

The invention concerns two-part polyurethane adhesives that provide final strength at relatively low post bake temperature conditions. The adhesive comprises a prepolymer having a reactive non-ionic surfactant and an allophanate modified isocyanate and a curative comprising less than 5 equivalent percent total amino and hydroxyl groups having an equivalent weight greater than about 200. The invention further concerns processes for adhering substrates with the adhesive composition.

2. The Related Art

Adhesives having initial solidification to adhere substrates to allow movement of the bonded substrates to a secondary post bake operation facilitate the manufacture of assembled parts and materials. Adhesives that accelerate the initial solidification will allow for more efficient production of parts.

For example, within the transportation market it is common practice to accelerate the initial solidification of an adhesive bond line by applying direct heat in a bond fixture, typically from about 82° C. to about 315° C., until a minimum strength is achieved to move the part, often referred to as green strength. Final adhesive strength is then achieved following a secondary post bake operation, generally at elevated temperatures, like those provided by a paint or electro-coat primer oven of about 149° C. to about 204° C.

Two challenges are present within the transportation industry, as well as other industries, involving the manufacture of materials having bonded parts, that may affect the performance of the adhesive used in bonding operations. First is the desire to minimize capital investment necessary to fabricate a bond fixture by the elimination of heat, and the second is the drive to reduce fixed cost by lowering the temperature of post bake ovens. With conventional adhesive technology, following room temperature cure with a reduced temperature post bake, such as in a temperature range of about 82° C. to about 104° C., the adhesive will solidify and provide bond strength and passing fiber tear failure pattern at room temperature, but the bond may fail in the undesirable adhesive failure mode during elevated temperature strength testing or in service use. Such bond failure can be eliminated or curtailed by sanding and/or priming the substrate, both requiring capital. Further, primerless, that is no surface preparation, two-part polyurethane adhesives have been mentioned in the art, however, the combination of materials making these primerless adhesives involve polymerizations requiring both high temperature fixture cure followed by a high temperature post bake to provide the requisite adhesion.

All parts and percentages set forth herein are on a weight-by-weight basis unless specified otherwise.

SUMMARY OF THE INVENTION

The invention concerns a polyurethane adhesive comprising a prepolymer and a curative. The prepolymer comprises a reactive non-ionic surfactant and an allophanate modified isocyanate. The curative comprises urethane modified high molecular weight polyol, urethane modified cross-linking compound and non-urethane modified low molecular weight chain extending compound. The curative comprises less than 5 equivalent percent total amino and hydroxyl groups having an equivalent weight greater than about 200. Polyurethane adhesives consisting essentially of or consisting of the prepolymer and curative are within the scope of the invention. Also, the prepolymer and/or curative may consist essentially of or consist of the components discussed herein. Desirable fiber tear failure pattern at elevated temperature following a room temperature cure and greatly reduced post bake temperature is achieved with these adhesives.

The invention further pertains to processes for adhering substrates with relatively low post bake conditions, for example at temperatures of about 19° C. to about 130° C., comprising the steps of providing at least a first substrate and a second substrate and applying the two-part polyurethane adhesive to a surface of at least one of the first substrate and/or second substrate and then mating the first and second substrates together. In embodiments of the invention, the adhesive is allowed to fully or partially cure at room temperature and then the substrates comprising the adhesive may be heated at relatively low post bake conditions to provide final strength.

DETAILED DESCRIPTION OF THE INVENTION

The polyurethane adhesive is generally a two-part adhesive comprising the prepolymer, the A side, and the curative, the B side. The prepolymer comprises a reactive non-ionic surfactant and an allophanate modified isocyanate and the curative comprises urethane modified high molecular weight polyol, urethane modified cross-linking compound and non-urethane modified low molecular weight chain extending compound. The level of urethane modification of the urethane modified high molecular weight polyol or urethane modified cross-linking compound may each be from about 1 equivalent percent to about 49 equivalent percent, preferably about 2.6 equivalent percent to about 49 equivalent percent, including from about 8 equivalent percent to about 16 equivalent percent. In an embodiment of the invention, the adhesive composition comprises from about 44% to about 53% of the prepolymer (the A side) and about 47% to about 56% of the curative (B the side) such that the isocyanate to hydroxyl index, i.e. the isocyanate index, is in the range of about 90% to about 150%, preferably from about 90% to about 120% and typically about 95% to about 112%.

In an embodiment, the A side comprises the reactive non-ionic surfactant, allophanate modified isocyanate, polyols, polymeric isocyantates and fillers. For example, the A side may comprise a combination of polyol, reactive non-ionic surfactant, allophanate modified methylene diphenyl isocyanate ("MDI"), polymeric methylene diphenyl isocyanate ("PMDI") and fillers. The polyols and surfactant are reacted with the allophanate modified isocyanate to form prepolymer isocyanate terminated oligomers. The range of isocyanate modified in such manner may vary from about 1 equivalent percent to about 25 equivalent percent. Typically this component is rich in unmodified isocyanate; the content of combined isocyanate is such that the amount of NCO ranges from about 10% to about 20%.

The B side, or curative, may comprise a combination of both high and low molecular weight polyols, such as those having an average functionality varying from about 2 to about 4. In the adhesive formulation, the polyols, except for the lowest molecular weight polyol in the B side which functions as the chain extending compound, are subjected to a pre-reaction with polymeric methylene diphenyl isocyanate to increase the relative molecular weight forming a hydroxyl terminated oligomer. The level of urethane modification of these polyols may be from about 1 equivalent percent to about 49 equivalent percent, preferably about 2.6 equivalent percent to about 49 equivalent percent, such as from about 8 equivalent percent to about 16 equivalent percent. Once this reaction is complete, the lowest molecular weight polyol, (chain extending compound), is added along with the fillers and amine for sag resistance.

Surfactants useful in the invention include those having amphipathic structure, i.e. groups of molecules with opposing solubility tendencies; adsorption at interfaces, i.e. the concentration of a surfactant solute at a phase interface is greater than its concentration in the bulk; orientation at interfaces, i.e. surfactant molecules form oriented mono-layers at phase interfaces and micelle formation, i.e. surfactants form aggregates of molecules when the concentration of the surfactant solute in the bulk of the solution exceeds a limiting value. The surfactants should have functional properties, such as cleaning, foaming, wetting, emulsifying, solubilizing, dispersion properties and the like and combinations thereof.

Non-ionic reactive surfactants may comprise a string of hydrophilic polymer with a string of hydrophobic polymer with isocyanate reactive end groups such as hydroxyl, amine or carboxylic acid. In an embodiment of the invention the non-ionic surfactant may comprise alcohol alkoxylates, such as alcohol ethoxylates, alcohol propoxylates and combinations thereof as well as propoxylated and ethoxylated alcohols. In an embodiment of the invention the amphipathic structure of the alcohol alkoxylate is established by combining a string of propylene oxide molecules as the hydrophobic section with a string of ethylene oxide molecules as the hydrophilic section. The molecular weight of the hydrophobic string may vary from about 800 to about 18,000, preferably from about 2,000 to about 4,000. The molecular weight of the hydrophilic string may vary from about 800 to about 18,000, preferably from about 2,000 to about 4,000. The non-ionic surfactant may have a hydrophilic, lipophillic balance ("HLB"), value from about 1 to about 18, preferably about 7 to about 16. The adhesive prepolymer may comprise from about 0.5% to about 50% reactive non-ionic surfactant, preferably from about 5% to about 15%. Examples of non-ionic surfactant that may be used in the invention include PLURONIC® block copolymer surfactants from BASF, Florham Park, N.J., U.S.A., such as PLURONIC® P105. The reactive non-ionic surfactant is typically used in the prepolymer component of the invention, however use in the B side or use in the A side and B side simultaneously is within the scope of the invention.

Other surfactants useful in the invention include those selected from the group consisting of alkylphenol ethoxylates, carboxylic acid esters, glycerol esters, polyoxyethylene ester, anhydrosorbitol esters, ethoxylated anhydrosorbitol esters, ethoxylated natural fats, oils, waxes, glycol esters of fatty acids, carboxylic amides, diethanolamine condensates, monoalkanolamine condensates, polyoxyethylene fatty acid amides, polyalkylene oxide block copolymers and poly(oxyethylene-co-oxypropylene) nonionic surfactants and the like. Combinations of these surfactants may be used.

Polyols that may be incorporated in the prepolymer as all or part of the non-ionic surfactant component, i.e. the polyol surfactant, include polyalkylene oxide based polyols. Suitable polyether polyols include polyethers made by the polymerization of epoxides such as ethylene oxide, propylene oxide, butylene oxide, tetrahydrofuran, styrene oxide, epichlorohydrin and the like or combinations thereof. The polyol surfactant, such as the polyether polyols, may comprise one or more of the aforementioned materials in mixture or in sequence with one or more polyols having an HLB of less than or equal to 1 representing a hydrophobic polyol or greater than about 18 representing a hydrophilic polyol. Polyols with HLB less than or equal to 1 or greater then about 18 will not have surfactant type properties and are not defined as surfactants. The molecular weight of the polyols may be from about 90 to about 18,000, preferably from about 500 to about 2,000. Polypropyleneoxide based polyols, such as those having functionality equal to about 2 may be used in the invention. The adhesive prepolymer composition can comprise up to about 25% of these polyols, typically about 1% to about 25%, and the preferred range is about 2% to about 16%.

Typical allophanate modified isocyanates useful in the invention are the reaction product of the remaining acidic proton of a urethane with additional isocyanate. The starting alcohol and isocyanate used to form the initial urethane may each vary from a wide source of raw materials. The alcohol may be mono-functional, diol or polyol or based on polyakylene oxide, polyester, aliphatic or aromatic. Generally, the alcohol will have a molecular weight varying from about 32 to about 26,000. The isocyanate may also vary in functionality from about one to about eight and may be aliphatic or aromatic; having a molecular weight from about 57 to about 3,000. Once the initial urethane is formed a secondary reaction is conducted between the remaining acidic proton of the urethane and additional isocyanate to form the allophanate. The secondary isocyanate may be identical to that used for the initial urethane formation or not. It may vary from a functionality of about 2 to about 10; it may be aliphatic or aromatic and may range in molecular weight from about 57 to about 3,000. Examples of such reaction products are described in, for example, U.S. Pat. Nos. 5,319,053, 5,663,272, 5,783,652, 5,319,054, 6,482,913, 6,887,399, 6,991,746, 6,028,158 and U.S. Pat. Application 2008/0227878 A1, all of which are incorporated herein by reference in their entirety. MONDUR® MA 2601 aromatic diisocyanate blend available from Bayer MaterialScience LLC, Pittsburgh, Pa., U.S.A., which is an allophanate modified 4,4'-diphenylmethane diisocyanate blended with polymeric diphenylmethane diisocyanate containing 2,4' isomer, may be used in the invention. The concentration of the allophanate modified isocyanate may be up to 100% of the isocyanate functional organic component. Typically, the composition comprises up to about 60%, such as from about 1% to about 60%, of the allophanate modified isocyanate.

Suitable polymeric isocyanates contain a blend of varying isomers of methylene diphenyl isocyanate with functionalities ranging from about 1 to about 10 with an average functionality of about 2.6. Other isocyanates or combinations thereof may include aliphatic or aromatic, mono or difunctional blended with multifunctional molecules such that the average functionality is greater than about 2. LUPRANATE® M20 isocyanate from BASF, which is polymethylene polyphenylpolyisocyanate, may be used. The concentration of polymeric isocyanate may be up to 100% of the isocyanate functional organic component.

Fillers suitable for use in the invention, and in particular the side A or prepolymer component, include talc, mica, kaolin, bentone clay, aluminum oxides, titanium oxides, iron oxides, barium sulfate, hornblendes, amphiboles, chrysotile, carbon black, carbon fibers, fumed silica, molecular sieves and the like, and combinations thereof. Preferred filler is talc, such as MISTRON® RCS talc from Rio Tinto Minerals, London, U.K. The prepolymer or curative components may comprise up to about 50% filler, typically about 1% to about 50% such as from about 10% to about 35%.

Fumed silica, when used in the composition, provides thixotropic viscosity enhancement to assist in the minimization of filler settling. Hydrophilic fumed silica, hydrophobic fumed silica, and the like and combinations thereof may be used and hydrophobic fumed silica is preferred. AEROSIL® R812 fumed silica from EVONIK® Industries AG, Essen, Germany may be used. The amount of fumed silica in the prepolymer or curative composition may be up to about 20%, typically from about 1% to about 20% such as from about 1% to about 5%.

Suitable molecular sieves are selected such that the pore opening is appropriate for the absorption of moisture. The preferred pore size is about 3 to about 5 angstroms. Type 5A molecular sieves are preferred. The amount of molecular sieves in the prepolymer or curative composition may be up to about 30%, typically about 1% to about 30% such as from about 2% to about 10%.

Suitable polyols for the curative, the B side, are typically based on polyalkylene oxide. The polyalkylene oxide generally comprise polyethers made by the polymerization of epoxides such as ethylene oxide, propylene oxide, butylene oxide, tetrahydrofuran, styrene oxide, epichlorohydrin and the like, and combinations thereof. The polyethers comprise one or more of the aforementioned materials as mixtures or in sequence. The polyether preferably comprises ethylene oxide capped polypropylene oxide, and may consist of or consist essentially of this material. The functionality typically ranges from about 1 to about 5, with a preferred functionality of about 2, and the HLB value may be up to about 20. The molecular weight of the polyol is typically from about 2,000 to about 20,000 and is preferably in the range of about 4,000 to about 12,000. For purposes of the invention, the term high molecular weight polyol shall mean a polyol having the molecular weight within the range of about 2,000 to about 20,000. The curative may comprise up to about 30 equivalent percent polyol, such as about 1 equivalent percent to about 30 equivalent percent, based on the total equivalents of isocyanate reactive components in the curative and preferably comprises from about 1 equivalent percent to about 18 equivalent percent. The polyols are typically urethane modified. The level of urethane modification of these polyols may be from about 1 equivalent percent to about 49 equivalent percent, preferably about 2.6 equivalent percent to about 49 equivalent percent, such as from about 8 equivalent percent to about 16 equivalent percent.

The urethane modified cross-linking compounds will act to increase the cross-link density of the product resulting in a higher modulus, lower elongation material. The urethane modified cross-linking compounds in the curative may be selected to have an isocyanate reactive functionality ranging from about 3 to about 8 with a preferred value of about 3 and a molecular weight in the range of about 84 to about 2,000, more typically in a range of about 84 to about 1,900, preferably from about 84 to about 900, and in the case of polyol, such would be considered for purposes of the invention a low molecular weight polyol, i.e., having a molecular weight of about 84 to about 2,000, typically, however, about 84 to about 1,900. The isocyanate reactive cross-linking compounds useful in the invention include those selected from the group consisting of trimethylolpropane, pentaerythritol, mannitol, triethylene glycol, glycerin, diethanolamine, diisopropanolamine, triethanoamine, toluene diamine, sorbitol, surcrose, glucoside mixtures thereof and their respective homolog's resulting from systematic chain extension by alkylene oxides such as ethylene oxide, propylene oxide, butylene oxide, tetrahydrofuran, styrene oxide or epichlorohydrin. The urethane modified cross-linking compound typically has a concentration up to about 70 equivalent percent, such as about 1 equivalent percent to about 70 equivalent percent, based on the total equivalents of isocyanate reactive components in the curative. A preferred concentration range is from about 18 equivalent percent to about 50 equivalent percent based on the total equivalents of isocyanate reactive components in the curative.

The non-urethane modified low molecular weight chain extending compounds are selected to increase the apparent hard block domain of the segmented structure or morphology created during the final urethane reaction when parts A and B are mixed together. These low molecular weight chain extending compounds may be hydroxyl or amine terminated, preferably hydroxyl terminated. For purposes of the invention, the term low molecular weight chain extending compound shall refer to such compounds having molecular weight in the range of about 25 to about 1,000. Typically, the non-urethane modified low molecular weight chain extending compound will have a molecular weight ranging from about 32 to about 600. By nature of their relative short length and polarity these compounds will function to enlarge the polar isocyanate region creating a macromolecular higher melting point region capable of acting as a pseudo cross-link in the overall system. The chain extending compound may have a functionality of about 2. The concentration of the non-urethane modified low molecular weight chain extending compound may vary from about 0.5 equivalent percent to about 90 equivalent percent, preferably from about 30 equivalent percent to 70 equivalent percent, based on the total equivalents of isocyanate functional components in the curative. The non-urethane modified low molecular weight chain extending compound may be selected from the group consisting of ethylene glycol, 1,5-pentanediol, 1,3-pentanediol, 1,3-butanediol, 2,3-butanediol, tripropyleneglycol, ethoxylated bisphenol A, 1,2-propanediol, 1,3-propanediol, 1,4-butanediol, 1,6-hexanediol, triethylene glycol, diethylene glycol, dipropylene glycol, 2-methyl-1,3-propane diol and the like, their respective chain extended homolog's and mixtures thereof. Preferred low molecular weight chain extending compounds include 1,4-butane diol, ethylene glycol, 1,2-propane diol, dipropylene glycol and combinations thereof.

The B side curative optionally comprises amine to create chemical thixotropy in the blended system by immediately reacting with the isocyanate in part A to form a pseudo gel creating body to eliminate sag. The molecular weight of the amine may vary from about 50 to about 450 and is typically from about 80 to about 180. The amine may be aliphatic, cycloaliphatic or aromatic, having a functionality of about 2 or higher. The preferred amines are those comprising primary or secondary amine groups, such as propylene diamine, butylene diamine, toluene diamine, isophorone diamine, 2-methyl-1,5-pentane diamine, diethylene triamine, pentamethylene diamine, 1-methyl-3,5-diethyl-2,6-diamino benzene, diethylene diamine, ethylenediamine, hexamethylenediamine, bis(4-aminocyclohexyl)methane, 1-amino-3,3,5-trimethyl-5-aminomethylcyclohexane, 2,4-diaminomesitylene, 1,3,5-triethyl-2,4-diaminobenzene, 1,8-diamino napthelene, piperazine and the like and combinations thereof. The preferred amine is piperazine. The concentration of the primary amine may be up to about 11 equivalent percent based on the isocyanate functional components in the curative, typically about 1 equivalent percent to about 11 equivalent percent such as in the range of about 3 equivalent percent to about 7 equivalent percent based on the isocyanate functional components in the curative.

The curative may comprise one or more catalysts. Suitable catalysts include those capable of accelerating the urethane chain extension and cross-linking reaction. Typically the catalyst comprises tertiary amine such as triethylamine, benzyldimethylamine, triethylenediamine, tetramethylbutanediamine and the like and combinations thereof. As an alternative to such amines or in addition to, the catalyst may comprise metal catalysts, including but not limited to stannous acetate, stannous octoate, stannous laurate, stannous oleate, dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate, trialyltin hydroxide, dialkyltin oxide, dibutylin disulfide, dibutyl tin diisooctylmaleate, dibutyltin dilauryl mercaptide, dibutyltin di(isooctylmercaptoacetate), zinc neodecanate, iron acetylacetonate, and bismuth compounds such as octoate, neodecanoate, pivalate, 2-ethylhexanoate, naphthanate and the like and combinations thereof. The concentration of the catalyst may vary based on the relative effectiveness of the catalyst selected but generally is in the range of about 0.01% to about 10%. Typically, the amount of catalyst is selected to create about a 5 minute open time and green strength about 4 to about 7 times the open time when evaluated at about 22° C.

The adhesive may also comprise additives and other components. Such additives include, but are not limited to, color pigments, dyes, IJV inhibitors, plasticizers, antifungal agents and anti bacterial agents. One skilled in the art should understand the types of such additives useful in the adhesive compositions.

The curative comprises less than 5 equivalent percent total amino and hydroxyl groups having an equivalent weight greater than about 200. Preferably the curative comprises less than about 4.5 equivalent percent, or less than about 4 equivalent percent including less than about 3 equivalent percent, total amino and hydroxyl groups having an equivalent weight greater than about 200. In embodiments of the invention the curative comprises from about 0.1 equivalent percent to about 4 equivalent percent, preferably from about 1 equivalent percent to about 3 equivalent percent, total amino and hydroxyl groups having an equivalent weight greater than about 200.

Equivalent weight can be calculated from experimentally determined hydroxyl numbers and/or amine numbers using the equation:

$$\text{Equivalent Weight} = \frac{56,100}{\text{The Hydroxyl or Amine Number}}$$

The corresponding molecular weight of a particular component can be determined by multiplying the equivalent weight by the functionality of the component.

In an embodiment of the invention the curative comprises from about 1 equivalent percent to about 18 equivalent percent of the high molecular weight polyol component, having from about 8 equivalent percent to about 16 equivalent percent urethane modification; from about 18 equivalent percent to about 50 equivalent percent of the cross-linking compound, having from about 8 equivalent percent to about 16 equivalent percent urethane modification; and from about 30 equivalent percent to about 70 equivalent percent of the non-urethane modified low molecular weight chain extending compound based on the total equivalents of isocyanate reactive components in the curative. In embodiments of the invention, the curative comprises about 25% to about 45% ethlyleneoxide capped polypropyleneoxide polyol having a functionality of about 2, about 10% to about 25% trimethylol propane initiated polypropylene oxide polyol having a functionality of about 3, about 1% to about 15% short chained diol having a functionality of about 2, such as 1,4-butane diol, about 1% to about 5% polymeric isocyanate, about 20% to about 45% talc, about 0.1% to about 2% primary amine such as piperazine and about 0.01% to about 0.5% triethylene diamine catalyst, such as DABCO® crystal catalyst from Air Products and Chemicals, Inc., Allentown, Pa., U.S.A.

The two-part polyurethane adhesive may be used to adhere substrates, typically applying a post bake operation. The adhesive can be used to adhere a wide variety of substrates, like composite materials, including but not limited to sheet molding compound composite, resin transfer molding composite, structural reaction injection molding composite and hand spray up composite. Other substrates include metallic materials such as cold rolled steel, aluminum, galvanized, stainless steel and the corresponding epoxy or polyester coated materials that may be applied to minimize corrosion. The two-part polyurethane adhesive provides acceptable bonding properties at reduced post bake temperature conditions, for example in the range of about 19° C. to about 130° C., even as high as 134° C., but more typically about 19° C. to about 115° C. In an embodiment, the post bake temperature conditions are at about 70° C. to about 115° C., such as about 82° C. to about 104° C. Conventional adhesive compositions typically require post bake temperature conditions in the range of about 135° C. to about 204° C.

The invention further concerns a process for adhering substrates with the two-part polyurethane adhesive described herein with reduced post bake temperatures, such as those discussed in the preceding paragraph. The process comprises the steps of providing at least a first substrate and a second substrate, such as those discussed above, applying the two-part polyurethane adhesive to a surface of at least one of the first substrate and/or second substrate, placing the substrates in contact with each other (i.e. mating the substrates) and heating, such as to a temperature of about 19° C. to about 115° C. In embodiments, the adhesive is allowed to fully or partially cure at temperatures of about 19° C. to about 35° C. prior to the heating step with the post bake heating providing final strength for some applications, for example, at a temperature above about 35° C. to about 115° C. The adhesive may be applied without primer and/or without significant surface preparation or abrasion.

For composite or metal uses, the adhesive composition is preferably applied robotically proceeded by gravity flow into geroter type pumps or alternatively through a follower plate configuration or manually with a side by side cartridge through a static or dynamic mix tube. No priming or surface abrasion of the composite is necessary.

The adhesives described herein, applied to composite without priming or surface abrasion, demonstrate excellent high temperature bond strength. The following examples demonstrate the preparation and application of the adhesive. While the invention has been described and illustrated in connection with preferred embodiments, it will be apparent to those skilled in the art that the invention is not limited thereto. In the following examples all temperatures are in degrees Celsius, all proportions are by weight unless expressly indicated and all bonding was on hand spray up composite, unless otherwise noted.

EXAMPLES

Mixing A and B Components

In the following examples, the A side and B side components were loaded individually and separately into side by side cartridges and pumped through a static mix tube to achieve complete mixing.

Construction of Test Samples

Lap Shear Test. The adhesive is applied directly from the static mix tube onto side one of the appropriate substrate. The lap shear test requires overlapping the last 2.5 cm of a pair of 10 cm by 2.5 cm coupons to create a 17.8 cm long sample with adhesive and 0.76 mm glass spacer beads between the overlap. The sample then is placed between a two sided fixture held at ambient temperature, 19° C. to 22° C., until solidified. Once removed from the fixture it is held at ambient temperature for 24 to 72 hours at which time the samples were post baked for 30 minutes at 82° C. In some examples no post bake was used, as specified. The sample is then returned to ambient temperature at which time it may be tested or further heated or cooled and tested at alternate temperatures to model practical in use applications. The most difficult test condition for an adhesive cured under these conditions is elevated temperature lap shear. Thus, the preferred temperature for the lap shear test was 60° C. The lap shear test was conducted according to ASTM D3163-01 with a crosshead speed of 0.127 cm per minute. Wedge peel tests were prepared and evaluated according to ASTM D5041-88 with a cross-head speed of 12.7 cm per minute. All adhesives were prepared at an isocyanate index of 112% unless otherwise noted. ASTM D3163-01 and ASTM D5041-98 are incorporated herein by reference in their entirety.

Example 1

Prepolymer, A1, in accordance with the invention, was prepared by blending 11.48 parts of reactive non-ionic surfactant (equivalent weight 3250 and HLB value of 15), 4.35 parts of polypropylene oxide (equivalent weight 500), 20.38 parts of dry talc and 36.8 parts of allophanate modified diphenyl methane diisocyanate (NCO functionality of 2.2, weight percent NCO of 29), heated to 71° C. and mixed for 60 minutes. Then, 21.92 parts of polymeric diphenyl methane diisocyanate (NCO functionality of 2.6 and 2,4'-isomer content of about 6%), 1.0 parts of fumed silica and 4.0 parts of 5A molecular sieves were added to yield a system having a final NCO content of about 17.1 percent.

Example 2

Curative, B1, in accordance with the invention, was prepared by mixing 35.2 parts of ethylene oxide capped polypropylene oxide diol (equivalent weight of 4315), 18.99 parts of propylene oxide capped trimethyol propane (equivalent weight of 140) and 2.5 parts of polymeric diphenylmethane diisocyanate (NCO functionality of 2.6 and 2,4'-isomer content of about 6%), heated to 71° C. and mixed for 60 minutes until all traces of isocyanate had been consumed. Then, 9.8 parts of 1,4-butanediol (equivalent weight 45), 0.75 parts of piperazine (equivalent weight 43), 32.65 parts of talc and 0.1 parts of triethylene diamine were added. The pre-reaction mixture had 2.15 equivalent percent total amino and hydroxyl groups having an equivalent weight greater than 200 and an ultimate viscosity of 18,900 mPa·s at 25° C.

Example 3 (Comparative)

Curative, B2, was prepared by mixing 35.2 parts of ethylene oxide capped polypropylene oxide diol (equivalent weight of 4315), 18.99 parts of propylene oxide capped trimethyol propane (equivalent weight of 140), 9.8 parts of 1,4-butanediol (equivalent weight 45) and 2.5 parts of polymeric diphenylmethane diisocyanate (NCO functionality of 2.6 and 2,4'-isomer content of about 6%), heated to 71° C. and mixed for 60 minutes until all traces of isocyanate had been consumed. Then, 0.75 parts of piperazine (equivalent weight 43), 32.65 parts of talc and 0.1 parts of triethylene diamine were added. The pre-reaction mixture contained 2.15 equivalent percent of isocyanate reactive components with equivalent weights greater than 200.

Example 4 (Comparative)

Curative, B3, was prepared by mixing 35.6 parts of ethylene oxide capped polypropylene oxide diol (equivalent weight of 2000), 18.99 parts of propylene oxide capped trimethyol propane (equivalent weight of 140) and 2.5 parts of polymeric diphenylmethane diisocyanate (NCO functionality of 2.6 and 2, 4'-isomer content of about 6%), heated to 71° C. and mixed for 60 minutes until all traces of isocyanate had been consumed. Then, 9.4 parts of 1,4-butanediol (equivalent weight 45), 0.75 parts of piperazine (equivalent weight 43), 32.6 parts of talc and 0.1 parts of triethylene diamine were added. The pre-reaction mixture contained 4.69 equivalent percent total amino and hydroxyl groups having an equivalent weight greater than 200.

Example 5 (Comparative)

Curative, B4, was prepared by mixing 38.3 parts of ethylene oxide capped polypropylene oxide diol (equivalent weight of 500), 18.99 parts of propylene oxide capped trimethyol propane (equivalent weight of 140) and 2.5 parts of polymeric diphenylmethane diisocyanate (NCO functionality of 2.6 and 2, 4'-isomer content of about 6%), heated to 71° C. and mixed for 60 minutes until all traces of isocyanate had been consumed. Then, 6.7 parts of 1,4-butanediol (equivalent weight 45), 0.75 parts of piperazine (equivalent weight 43), 32.6 parts of talc and 0.1 parts of triethylene diamine were added. The pre-reaction mixture contained 20.2 equivalent percent total amino and hydroxyl groups having an equivalent weight greater than 200.

Example 6 (Comparative)

Curative, B5, was prepared by mixing 38.6 parts of ethylene oxide capped polypropylene oxide diol (equivalent weight of 4315), 18.99 parts of propylene oxide capped trimethyol propane (equivalent weight of 140), 8.95 parts of 1,4-butanediol (equivalent weight 45), 0.75 parts of piperazine (equivalent weight 43), 32.6 parts of talc and 0.1 parts of triethylene diamine. The mixture contained 2.15 equivalent percent total amino and hydroxyl groups having an equivalent weight greater than 200.

Example 7 (Comparative)

Prepolymer, A2, was prepared by blending 14.53 parts of reactive non-ionic surfactant (equivalent weight 3250 and HLB value of 15), 4.35 parts of polypropylene oxide (equivalent weight 500), 20.38 parts of dry talc and 55.73 parts of polymeric diphenyl methane diisocyanate (NCO functionality of 2.6 and 2,4'-isomer content of about 6%), heated to 71° C. and mixed for 60 minutes. Then, 1.0 part of fumed silica and 4.0 parts of 5A molecular sieves were added to yield a system having a final NCO content of 17.0 percent.

Example 8 (Comparative)

Prepolymer, A3, was prepared by blending 11.48 parts of polyethylene oxide (equivalent weight 3000, HLB≧20), 4.35 parts of polypropylene oxide (equivalent weight 500), 20.38 parts of dry talc and 36.8 parts of allophanate modified diphenyl methane diisocyanate (NCO functionality of 2.2, weight percent NCO of 29), heated to 71° C. and mixed for 60 minutes. Then, 21.92 parts of polymeric diphenyl methane diisocyanate (NCO functionality of 2.6 and 2,4'-isomer content of about 6%), 1.0 parts of fumed silica and 4.0 parts of 5A molecular sieves were added to yield a system having a final NCO content of 17.1 percent.

Example 9 (Comparative)

Prepolymer, A4, was prepared by blending 11.48 parts of polypropylene oxide (equivalent weight 3187, HLB=0), 4.35 parts of polypropylene oxide (equivalent weight 500), 20.38 parts of dry talc and 36.86 parts of allophanate modified diphenyl methane diisocyanate (NCO functionality of 2.2, weight percent NCO of 29), heated to 71° C. and mixed for 60 minutes. Then, 21.92 parts of polymeric diphenyl methane diisocyanate (NCO functionality of 2.6 and 2,4'-isomer content of about 6%), 1.0 part of fumed silica and 4.0 parts of 5A molecular sieves were added to yield a system having a final NCO content of 17.1 percent.

Examples 10-17

The aforementioned prepolymers and curatives described in Examples 1-9 were blended and evaluated in lap shear at 60° C. using the combinations shown in Table 1. While the results are shown in both strength and percent fiber tear the critical parameter for consideration is fiber tear demonstrating the adhesive bond is stronger than the substrate.

TABLE 1

| Example # | Prepolymer | Curative | Curative Equiv. % Comp. with Mol. Wt. >200 | Invention or Comparison | 60 C. Lap Shear Strength, MPa | 60 C. Lap Shear % Fiber Tear |
|---|---|---|---|---|---|---|
| 10 | A1 | B1 | 2.15 | Invention | 4.3 | 100 |
| 11 | A1 | B2 | 2.15 | Comparison | 4.0 | 55 |
| 12 | A1 | B3 | 4.69 | Comparison | 5.4 | 15 |
| 13 | A1 | B4 | 20.2 | Comparison | 3.0 | 0 |
| 14 | A1 | B5 | 2.15 | Comparison | 5.9 | 15 |
| 15 | A2 | B1 | 2.15 | Comparison | 4.4 | 0 |
| 16 | A3 | B1 | 2.15 | Comparison | 4.2 | 0 |
| 17 | A4 | B1 | 2.15 | Comparison | 3.4 | 0 |

Example 10, in accordance with the invention, combining A1 and B1 yielded 100 percent composite fiber tear. The prepolymer A1 includes the reaction product of a non-ionic surfactant and an allophanate modified isocyanate blended with polymeric isocyanate. The curative B1 includes a urethane modified high molecular weight polyol (MW=8630), a urethane modified cross-linking compound (MW=420) and a non-urethane modified low molecular weight chain extending compound (MW=90) wherein the curative has pre-reaction total amino and hydroxyl groups having an equivalent weight greater than 200 of 2.15 equivalent percent.

Example 11 blends prepolymer A1 with curative B2 that includes a urethane modified high molecular weight polyol (MW=8630) a urethane modified cross-linking compound (MW=420) and a urethane modified low molecular weight chain extending compound (MW=90) wherein the curative has pre-reaction total amino and hydroxyl groups having an equivalent weight greater than 200 of 2.15 equivalent percent. Although not wishing to be bound by any theory, the inventors believe the reduction of fiber tear to 55 percent is due to urethane modification of the low molecular weight chain extending compound.

Example 12 blends prepolymer A1 with curative B3 prepared by substituting a lower molecular weight difunctional polyol (MW=4000) for the high molecular weight polyol. This curative has pre-reaction total amino and hydroxyl groups having an equivalent weight greater than 200 of 4.69 equivalent percent and failed with 15 percent fiber tear. Although not wishing to be bound by any theory, the inventors believe these results indicate lower equivalent percent formulations are preferred.

Example 13 blends prepolymer A1 with curative B4 prepared by substituting a very low molecular weight polyol (MW=1000) for the high molecular weight polyol. This curative has pre-reaction total amino and hydroxyl groups having an equivalent weight greater than 200 of 20.2 equivalent percent and failed with zero percent fiber tear.

Example 14 blends prepolymer A1 with curative B5 prepared without urethane modifying either the high molecular weight polyol, the cross-linking compound or the low molecular weight chain extending compound. The curative maintains total amino and hydroxyl groups having an equivalent weight greater than 200 of 2.15 equivalent percent. This combination yielded 15 percent fiber tear. Although not wishing to be bound by any theory, the inventors believe that the results indicate that urethane modification of the high molecular weight polyol and cross-linking compound contribute to the desired fiber tear results of the invention which were not achieved in this example.

Examples 15 to 17 evaluate changes made to the prepolymer portion of the adhesive pair. In Examples 15 to 17, curative B1 representative of the invention was used.

Example 15 eliminates the allophanate modification from the isocyanate used to end cap the reactive non-ionic surfactant and propylene oxide based polyol in the prepolymer. Instead polymeric diphenyl methane diisocyanate (NCO functionality of 2.6 and 2,4'-isomer content of about 6%) was used. This resulted in zero percent fiber tear.

In Example 16, the reactive non-ionic surfactant of the prepolymer was replaced with a similar equivalent weight polyol based only on ethylene oxide with HLB greater than about 20 such that the polyol has no surfactant properties. This resulted in zero percent fiber tear.

In Example 17, the reactive non-ionic surfactant of the prepolymer was replaced with a similar equivalent weight polyol based only on propylene oxide with HLB of 0 such that the polyol has no surfactant properties. This resulted in zero percent fiber tear.

Example 18

Prepolymer A1 and curative B1 were combined, in accordance with the invention, and this combination was evaluated for adhesion over hand spray up ("HSU"), sheet molding compound ("SMC") and resin transfer molding ("RTM"), type composites. Each set of lap shear test specimens were cured for 24 hours at ambient temperature followed by a 30 minute post bake using incrementally lower temperatures. The results are set forth in Table 2.

TABLE 2

| Substrate Type | 104° C. Post Bake | | 82° C. Post Bake | | 60° C. Post Bake | | 43° C. Post Bake | | No Post Bake | |
|---|---|---|---|---|---|---|---|---|---|---|
| | Strength MPa | Fiber Tear | Strength MPa | Fiber Tear | Strength MPa | Fiber Tear | Strength MPa | Fiber Tear | Strength MPa | Fiber Tear |
| HSU | 5.9 | 100 | 908 | 100 | 4.7 | 25 | — | — | 3.5 | 10 |
| RTM | 4.7 | 100 | 4.9 | 100 | 4.9 | 100 | 4.9 | 100 | 4.8 | 100 |
| SMC | 3.5 | 100 | 2.9 | 100 | 3.4 | 100 | 3.6 | 100 | 3.5 | 100 |

Example 19

Prepolymer A1 was combined with curative B1, in accordance with the invention, used to bond SMC and evaluated in lap shear vs. test temperature and following a seven day water soak at 54° C. Wedge peel samples were also prepared and evaluated at ambient conditions. Data are set forth in Table 3.

TABLE 3

| | −30° C. Lap Shear | 19° C. Lap Shear | 60° C. Lap Shear | 82° C. Lap Shear | 7 Day WS Lap Shear | Wedge Peel |
|---|---|---|---|---|---|---|
| Strength, MPa | 5.2 | 3.4 | 3.8 | 3.1 | 3.7 | 0.2 |
| % Fiber Tear | 100 | 100 | 100 | 100 | 100 | 90 |

Example 20

Prepolymer A1 and curative B1 were combined, in accordance with the invention, having the isocyanate index varied from a low of 103% to a high of 134% as show in Table 4. Samples were then tested for lap shear performance at 60° C. over HSU composite vs. the index and the results are set forth in Table 4.

TABLE 4

| Index, % | 134 | 121 | 118 | 113 | 112 | 111 | 103 |
|---|---|---|---|---|---|---|---|
| % Fiber Tear | 0 | 0 | 20 | 40 | 100 | 85 | 85 |

What is claimed is:

1. A two-part polyurethane adhesive comprising
    a) a prepolymer comprising the reaction product of a non-ionic surfactant and an allophanate modified isocyanate; and
    b) a curative comprising a urethane modified high molecular weight polyol, a urethane modified cross-linking compound and a non-urethane modified low molecular weight chain extending compound wherein the curative has less than 5 equivalent percent of total amino and hydroxyl groups based on the total equivalents of isocyanate reactive components in the curative having an equivalent weight greater than about 200.

2. The two-part polyurethane adhesive of claim 1 further comprising a polymeric isocyanate.

3. The two-part polyurethane adhesive of claim 2 wherein the polymeric isocyante comprises polymeric methylene diphenyl isocyanate.

4. The two-part polyurethane adhesive of claim 1 wherein the curative has less than about 4.5 equivalent percent of total amino and hydroxyl groups based on the total equivalents of isocyanate reactive components in the curative having an equivalent weight greater than about 200.

5. The two-part polyurethane adhesive of claim 1 wherein the curative has less than about 4 equivalent percent of total amino and hydroxyl groups based on the total equivalents of isocyanate reactive components in the curative having an equivalent weight greater than about 200.

6. The two-part polyurethane adhesive of claim 1 wherein the non-ionic surfactant is selected from the group consisting of alcohol alkoxylates, alkylphenol ethoxylates, carboxylic acid esters, glycerol esters, polyoxyethylene ester, anhydrosorbitol esters, ethoxylated anhydrosorbitol esters, ethoxylated natural fats, oils, waxes, glycol esters of fatty acids, carboxylic amides, diethanolamine condensates, monoalkanolamine condensates, polyoxyethylene fatty acid amides, polyalkylene oxide block copolymers, poly(oxyethylene-co-oxypropylene) nonionic surfactants and combinations thereof.

7. The two-part polyurethane adhesive of claim 1 wherein the allophanate modified isocyanate comprises allophanate modified methylene diphenyl isocyanate.

8. The two-part polyurethane adhesive of claim 1 wherein the nonionic surfactant comprises a polyol surfactant.

9. The two-part polyurethane adhesive of claim 8 wherein the polyol surfactant is made by polymerizing epoxides selected from the group consisting of ethylene oxide, propylene oxide, butylene oxide, tetrahydrofuran, styrene oxide, epichlorohydrin and combinations thereof.

10. The two-part polyurethane adhesive of claim 8 wherein the polyol surfactant is in mixture or in sequence with one or more polyols having a hydrophilic, lipophillic balance of less than or equal to 1 or greater than about 18.

11. The two-part polyurethane adhesive of claim 1 wherein the urethane modified high molecular weight polyol has a molecular weight of about 2,000 to about 20,000.

12. The two-part polyurethane adhesive of claim 1 wherein the urethane modified high molecular weight polyol is a polyalkylene oxide.

13. The two-part polyurethane adhesive of claim 12 wherein the polyalkylene oxide is made by polymerizing epoxides selected from the group consisting of ethylene oxide, propylene oxide, butylene oxide, tetrahydrofuran, styrene oxide, epichlorohydrin and combinations thereof.

14. The two-part polyurethane adhesive of claim 1 wherein the urethane modified cross-linking agent has an isocyanate reactive functionality of about 3 to about 8.

15. The two-part polyurethane adhesive of claim 1 wherein the non-urethane modified low molecular weight chain extending compound has a molecular weight of about 25 to about 1,000.

16. The two-part polyurethane adhesive of claim 1 wherein the non-urethane modified low molecular weight chain extending compound is a polyol.

17. The two-part polyurethane adhesive of claim 1 wherein the non-urethane modified low molecular weight compound is selected from the group consisting of ethylene glycol, 1,5-pentanediol, 1,3-pentanediol, 1,3-butanediol, 2,3-butanediol, tripropyleneglycol, ethoxylated bisphenol A, 1,2-propanediol, 1,3-propanediol, 1,4-butanediol, 1,6-hexanediol, triethylene glycol, diethylene glycol, dipropylene glycol, 2-methyl-1,3-propane diol, a chain extending homolog thereof and combinations thereof.

18. The two-part polyurethane adhesive of claim 1 wherein the prepolymer further comprises a filler selected from the group consisting of talc, mica, kaolin, bentone clay, aluminum oxides, titanium oxides, iron oxides, barium sulfate, hornblendes, amphiboles, chrysotile, carbon black, carbon fibers, fumed silica, molecular sieves and combinations thereof.

19. The two-part polyurethane adhesive of claim 1 wherein the curative further comprises an amine.

20. The two-part polyurethane adhesive of claim 19 wherein the amine has a functionality of about 2 or more.

21. The two-part polyurethane adhesive of claim 1 wherein the curative further comprises a catalyst.

22. A process for adhering substrates comprising the steps of
a) providing at least a first substrate and a second substrate each having one or more surfaces;
b) applying the two-part polyurethane adhesive of claim 1 to one or more surfaces of the first substrate or second substrate; and
c) placing the first substrate and second substrate in contact with each other.

23. The process of claim 22 comprising the additional step of heating the first substrate and second substrate after being placed in contact with each other to a temperature of about 19° C. to about 115° C.

24. The process of claim 23 comprising the additional step of allowing the adhesive to cure at a temperature of about 19° C. to about 35° C. prior to the heating the first substrate and second substrate.

25. The process of claim 22 wherein the two-part polyurethane adhesive comprises a curative having less than about 4.5 equivalent percent of total amino and hydroxyl groups based on the total equivalents of isocyanate reactive components in the curative having an equivalent weight greater than 200.

26. The process of claim 22 wherein the first substrate or second substrate is not treated with primer prior to the application of the two-part polyurethane adhesive.

* * * * *